Dec. 11, 1962 R. N. SMITH 3,068,420
FREQUENCY DISCRIMINATOR
Filed June 12, 1959

RALPH N. SMITH
INVENTOR.

BY Fleher and Swain
ATTORNEYS 3,068,420

FREQUENCY DISCRIMINATOR

Ralph N. Smith, Los Altos, Calif., assignor to Ampex Corporation, Redwood City, Calif., a corporation of California Filed June 12, 1959, Ser. No. 819,863
2 Claims. (Cl. 329—103)

This invention relates generally to a discriminator and more particularly to a discriminator which employs an inductor exhibiting a high ratio of unsaturated inductance to saturated inductance.

It is a general object of the present invention to provide a frequency discriminator which provides output pulses each having a constant average value at a frequency dependent upon the input frequency.

It is another object of the present invention to provide a frequency discriminator which employs switching transistors to control excitation of the inductor.

These and other objects of the invention will become more clearly apparent from the following description when taken in conjunction with the accompanying drawing.

Referring to the drawing.

Figure 1:
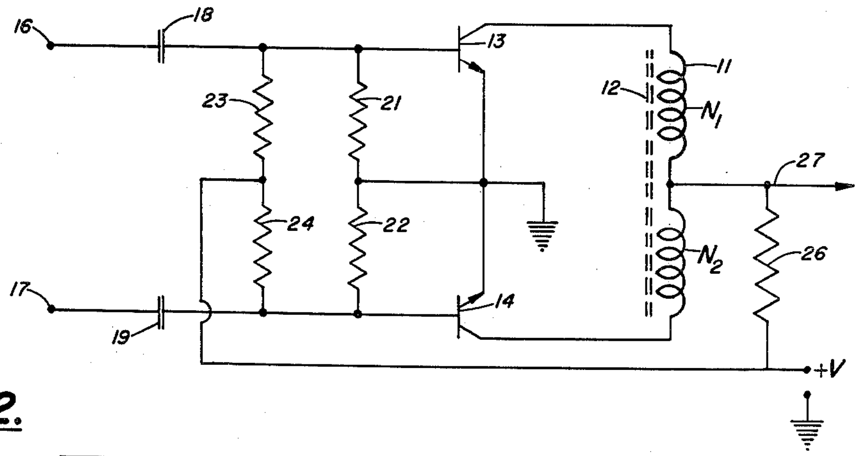
FIGURE 1 shows a circuit diagram of a discriminator in accordance with the present invention.

Referring to FIGURE 1, the discriminator includes an inductor 11. The inductor comprises a core 12 which carries windings $N_1$ and $N_2$. Preferably, the core material has a high ratio of unsaturated inductance to saturated inductance with an accurately defined transition between the two states. Core materials of this character are known in the art.

Transistors 13 and 14 are driven in push-pull from the input signal and serve to alternately connect the windings $N_1$ and $N_2$ to the voltage supply +V at a frequency corresponding to the input frequency, as will be presently described.

The transistor 13 has its collector connected to one terminal of the $N_1$ winding and its emitter is grounded. Similarly, the transistor 14 has its collector connected to one terminal of the winding $N_2$ and its emitter is grounded. The push-pull input signal is applied to the terminals 16 and 17 which are capacitively coupled by capacitors 18 and 19 to the base of the transistors 13 and 14, respectively. The resistors 21 and 22 are connected between the base of the transistors 13 and 14 and ground. A suitable bias voltage is applied to the base from the voltage source +V through the resistors 23 and 24. A load resistor 26 is connected between the voltage supply and the output terminal 27 which output terminal is connected to the common terminal of the windings $N_1$ and $N_2$.

Figure 2:
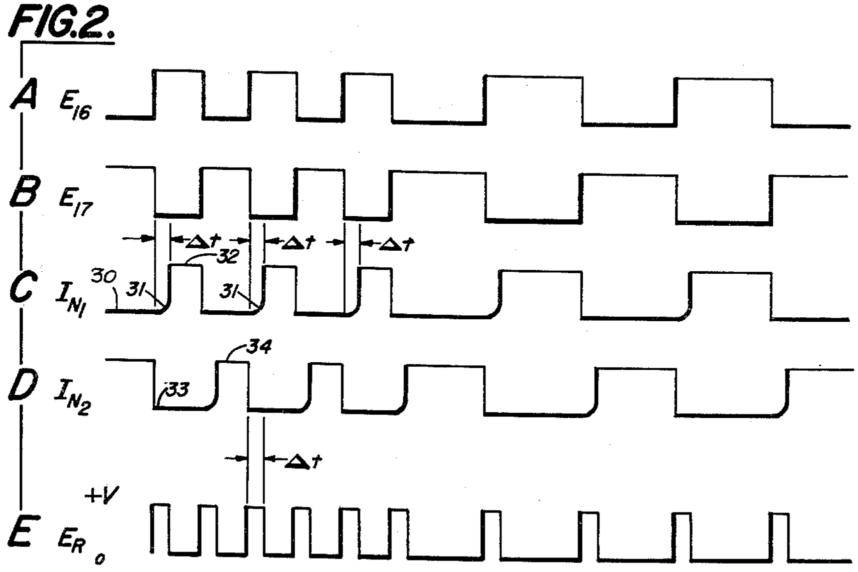
FIGURE 2 shows typical waveforms at various points in the circuit of FIGURE 1.

Referring to FIGURES 2A and B, push-pull square-wave signals of varying frequency are shown. The signal in FIGURE 2A represents the signal applied at the terminal 16 and is designated as $E_{16}$. The signal shown in FIGURE 2B represents the signal applied at the terminal 17 and is designated $E_{17}$.

In FIGURE 2C, the current flowing through the winding $N_1$ as a result of the switching of the transistor 13 is illustrated. Thus, when the signal at the terminal 16 is positive, the transistor is highly conductive and effectively connects the collector to ground. Thus, a current path exists between the +V supply through the resistor 26 and winding $N_1$ to ground. Initially, the impedance presented by winding $N_1$ will be relatively high and the current flowing through the inductor will be relatively small as indicated at 31, FIGURE 2C. As soon as the core is saturated, the inductive component becomes small and the impedance is considerably decreased. The current flowing through the winding $N_1$ will increase, being limited only by the resistor 26 and the resistance of the winding $N_1$ and the collector to emitter resistance of the transistor 13. The current is indicated by the flat peak 32, FIGURE 2C. As soon as the voltage applied to the transistor 13 is reversed, the bias on the base of the transistor 13 is such that the path from collector to emitter is effectively an open circuit. The current is effectively zero as indicated at 31, FIGURE 2C.

Operation of the transistor 14 and winding $N_2$ is identical to that described above. A typical current waveform is shown in FIGURE 2D. Thus, low current 33 flows when the voltage is negative, and as soon as the voltage becomes positive, the transistor presents a low impedance and the current wants to increase. The time $\Delta t$ corresponds to the time it takes the core to saturate as a result of the volt-seconds applied thereto.

In FIGURE 2E, the voltage across the load resistor 26 is illustrated. It will be observed that when there are relatively small currents flowing through the resistor 26, the voltage at the terminal 27 will be very near the voltage +V. As soon as currents begin to flow through the resistor 26, the voltage will be considerably reduced. Thus, an output voltage of the form shown in FIGURE 2E is derived. It is seen that an output voltage pulse occurs each time one of the transistors 13 and 14 is switched. The pulse will have a constant area which corresponds to constant volt-seconds applied to the core to saturate the same. Thus, output pulses are formed which have constant energy. It is seen that the frequency for the first three cycles of the input signal illustrated is relatively high, while the frequency for the remaining cycles is low. As a result, switching takes place at different rates, depending upon the input frequency. The output voltage at the terminal 27 will be a series of pulses having a frequency corresponding to the frequency of the input signal. Since these pulses have constant energy, they may be averaged to provide an output voltage representative of the frequency input signal.

It is observed that by employing transistors 13 and 14 as switches, they present a relatively low impedance when they are in the closed condition and a relatively high impedance in the open condition.

Preferably, the bias voltage applied to the base of the transistors is such that the core windings are effectively short circuited during the switching interval. This allows the fields in the core to be reversed with relatively small resistive losses.

In one particular example a discriminator in accordance with the foregoing was constructed in which the voltages and components had the following values:

| | |
|---|---|
| Voltages: | |
| +V | 16 volts. |
| Transistors: | |
| 13 | 2N440. |
| 14 | 2N440. |
| Capacitors: | |
| 18 | .005 mmf. |
| 19 | .005 mmf. |
| Resistors: | |
| 21 | 4.7K ohms. |
| 22 | 4.7K ohms. |
| 23 | 1K ohms. |
| 24 | 1K ohms. |
| 26 | 1K ohms. |
| Inductor: | |
| Core | Magnetics Inc. Part No. 80023D1/810. |
| Windings | 200T No. 38 wire each side. |

The output signal, line 27, was applied to a suitable filter and the D.C. output voltage as measured. It was found that the output voltage varied linearly with the input frequency with a linearity better than .2 percent with frequencies between 32.40 kc. and 75.60 kc. applied.

Figure 3:
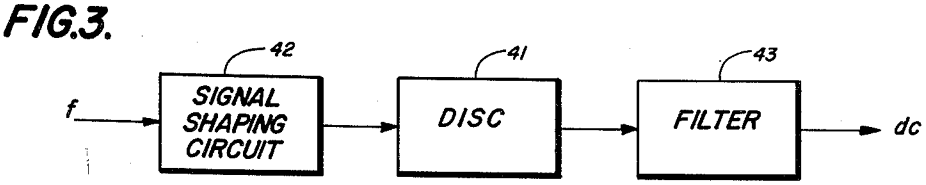
FIGURE 3 shows a block diagram of a frequency to voltage converter employing a discriminator in accordance with the invention.

Referring to FIGURE 3, a discriminator 41 of the type shown in FIGURE 1 is shown connected to a signal shaping circuit 42 and a filter circuit 43 is connected to the output. An input signal frequency which may be sinewave, squarewave or any other wave shape, is applied to the signal shaping circuit which shapes the signal and supplies a squarewave signal at the original frequency to the discriminator 41. The squarewave serves to switch the transistors as previously described. The constant energy output pulses from the discriminator are applied to a filter 43 which serves to form an output voltage whose amplitude is proportional to the frequency of the input signal.

I claim:

1. A frequency discriminator for providing an output voltage proportional to the frequency of an input signal, comprising an inductor including two series-connected windings mounted on a saturable core and providing a relatively high ratio of unsaturated to saturated inductance, a pair of transistors each having base, emitter, and collector electrodes with the respective emitter electrodes connected together and the respective collectors connected to opposite terminals of the two windings, means for receiving a push-pull voltage having an input frequency coupled to the respective bases of the transistors, means for applying base-to-emitter bias to the transistors, and means including a load resistor connected between the emitters of the transistors and common point between the two windings for applying an operating potential, whereby a series of equal pulses is developed across the load resistor at a rate equal to the input frequency with each pulse having a duration corresponding to volt-seconds applied to saturate the core and the average value of the series of pulses is proportional to the input frequency.

2. A frequency discriminator for providing an output proportional to the frequency of an input signal, comprising an inductor including two series-connected windings mounted on a saturable core and providing a relatively high ratio of unsaturated to saturated inductance, a pair of switches each having a current path controlled by a control element with the current path of one connected in series with the other and with the two windings in a closed circuit, a power supply and load resistor connected from the common point of the current paths to the common point of the two windings, and means coupled to the respective control elements for alternately opening and closing the respective current paths in accordance with the frequency of an input signal, whereby equal pulses occur across the load resistor at the frequency of the input signal and the average value of a series of such pulses is proportional to the input frequency.

References Cited in the file of this patent

UNITED STATES PATENTS

| | | |
|---|---|---|
| 2,587,755 | Packard et al. | Mar. 4, 1952 |
| 2,838,669 | Horsch | June 10, 1958 |
| 2,860,193 | Lindsay | Nov. 11, 1958 |
| 2,970,301 | Rochelle | Jan. 31, 1961 |

FOREIGN PATENTS

| | | |
|---|---|---|
| 546,754 | Great Britain | Acc. July 29, 1942 |